(12) United States Patent
Misawa

(10) Patent No.: US 11,303,157 B2
(45) Date of Patent: Apr. 12, 2022

(54) POWER TRANSMITTING DEVICE AND POWER RECEIVING DEVICE

(71) Applicant: Toyota Jidosha Kabushiki Kaisha, Toyota (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/061,158

(22) Filed: Oct. 1, 2020

(65) Prior Publication Data

US 2021/0021159 A1 Jan. 21, 2021

Related U.S. Application Data

(62) Division of application No. 16/001,474, filed on Jun. 6, 2018, now Pat. No. 10,833,534.

(30) Foreign Application Priority Data

Jun. 8, 2017 (JP) .............................. JP2017-113577

(51) Int. Cl.
*H02J 50/12* (2016.01)
*H02J 50/80* (2016.01)
(Continued)

(52) U.S. Cl.
CPC ............ *H02J 50/12* (2016.02); *B60L 53/122* (2019.02); *B60L 53/126* (2019.02); *B60L 53/65* (2019.02);
(Continued)

(58) Field of Classification Search
CPC ........ H02J 50/12; H02J 7/0013; H02J 7/0027; H02J 50/80; H02J 7/025; H02J 2310/40;
(Continued)

(56) References Cited

U.S. PATENT DOCUMENTS 7,741,734 B2 6/2010 Joannopoulos et al.
2007/0222542 A1 9/2007 Joannopoulos et al.
(Continued)

FOREIGN PATENT DOCUMENTS

AU 2006269374 B2 10/2009
AU 2007349874 A2 1/2010
(Continued)

*Primary Examiner* — Toan T Vu
(74) *Attorney, Agent, or Firm* — Dinsmore & Shohl LLP

(57) ABSTRACT

A power transmitting device is configured to perform a "power transmission frequency adjustment control" applied to adjust a power transmission frequency representing a frequency of power to be transmitted. A power receiving device is configured to perform a "resonance frequency adjustment control" applied to adjust a resonance frequency of a power receiving unit contactlessly receiving the power transmitted from the power transmitting device. The power transmitting device uses control information received from the power receiving device to determine whether the power receiving device has a function of performing the resonance frequency adjustment control applied to adjust the resonance frequency of the power receiving unit. When the power receiving device has the function of performing the resonance frequency adjustment control, the power transmitting device selects one of the power transmission frequency adjustment control and the resonance frequency adjustment control that has a higher resolution.

3 Claims, 9 Drawing Sheets

(51) Int. Cl.
*H01F 38/14* (2006.01)
*B60L 53/65* (2019.01)
*B60L 53/122* (2019.01)
*B60L 53/126* (2019.01)
*H02J 7/02* (2016.01)
*H02J 7/00* (2006.01)

(52) U.S. Cl.
CPC ............ *H01F 38/14* (2013.01); *H02J 7/0013* (2013.01); *H02J 7/0027* (2013.01); *H02J 7/025* (2013.01); *H02J 50/80* (2016.02)

(58) Field of Classification Search
CPC ........ H02J 50/70; B60L 53/126; B60L 53/65; B60L 53/122; H01F 38/14; Y02T 90/169; Y02T 90/12; Y02T 90/14; Y02T 10/70; Y02T 10/7072; Y02T 90/167; Y04S 30/14
See application file for complete search history.

(56) References Cited

U.S. PATENT DOCUMENTS

| | | | |
|---|---|---|---|
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2012/0098330 A1 | 4/2012 | Ichikawa et al. | |
| 2012/0286582 A1* | 11/2012 | Kim .................... | H02J 5/005 307/104 |
| 2013/0127409 A1 | 5/2013 | Ichikawa | |
| 2013/0193749 A1 | 8/2013 | Nakamura et al. | |
| 2014/0292270 A1 | 10/2014 | Ichikawa | |
| 2015/0022013 A1* | 1/2015 | Kim .................... | H02J 7/025 307/104 |
| 2018/0048189 A1 | 2/2018 | Park | |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| CN | 105409131 A | 3/2016 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013110822 A | 6/2013 |
| JP | 2013126327 A | 6/2013 |
| JP | 2013146148 A | 7/2013 |
| JP | 2013146154 A | 7/2013 |
| JP | 2013154815 A | 8/2013 |
| JP | 5848359 B2 | 1/2016 |
| KR | 20080031398 A | 4/2008 |
| KR | 20100015954 A | 2/2010 |
| WO | 2007008646 A2 | 1/2007 |
| WO | 2008118178 A1 | 10/2008 |
| WO | 2013/108108 A2 | 7/2013 |

* cited by examiner

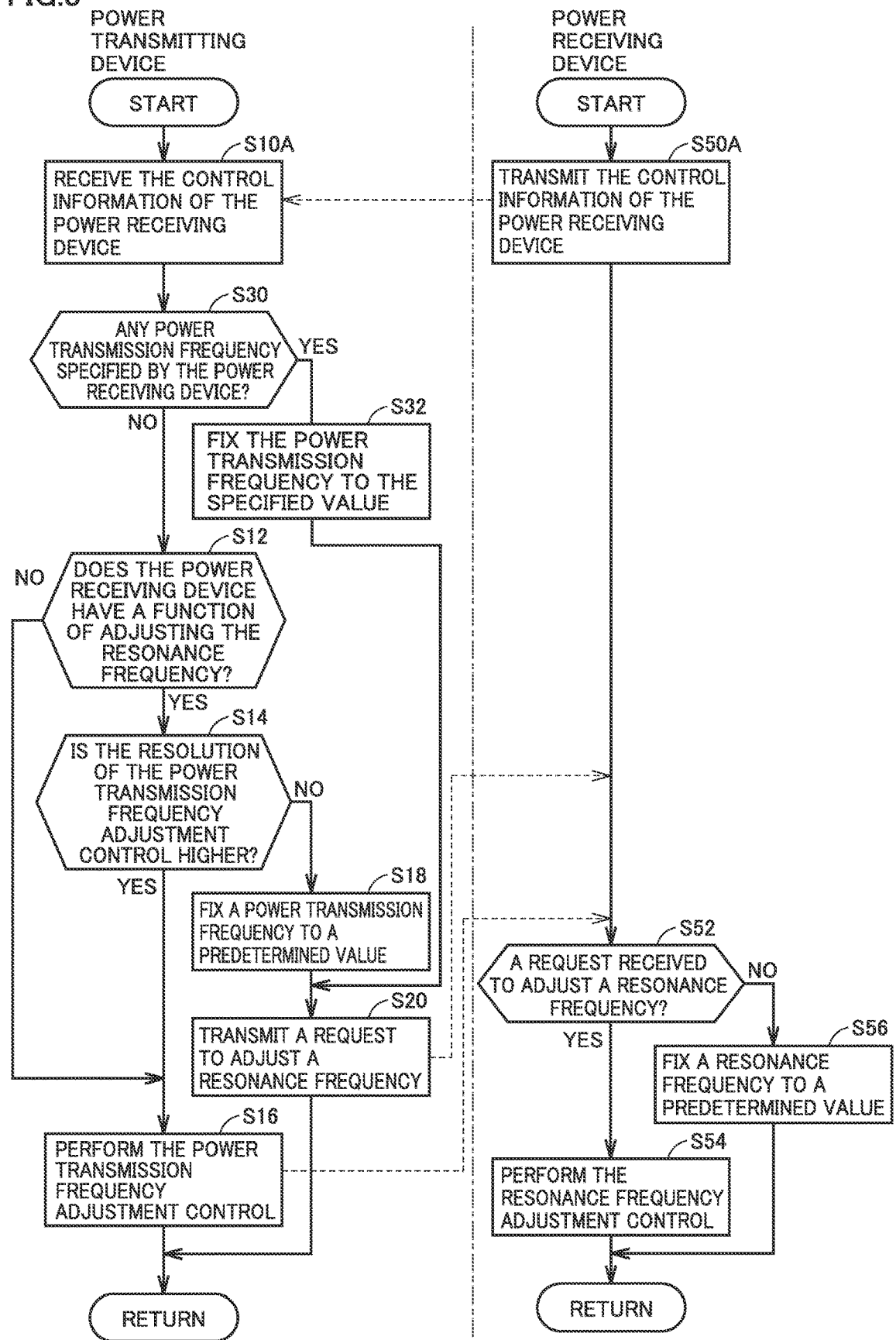

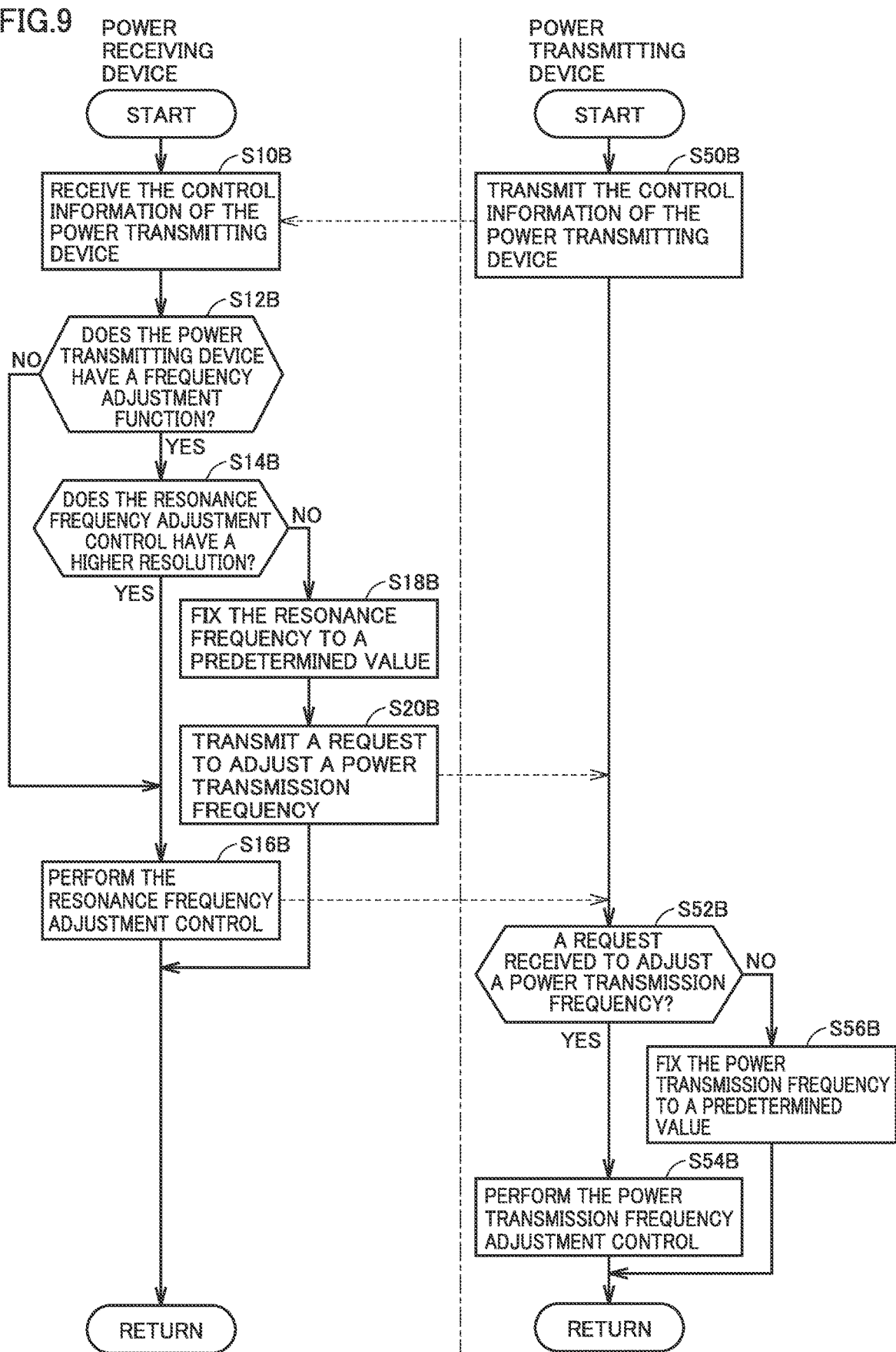

POWER TRANSMITTING DEVICE AND POWER RECEIVING DEVICE

CROSS-REFERENCE TO RELATED APPLICATIONS

This application is a divisional application of U.S. patent application Ser. No. 16/001,474, filed on Jun. 6, 2018, and entitled "Power Transmitting Device and Power Receiving Device", which claims priority to Japanese Patent Application No. 2017-113577 filed on Jun. 8, 2017, with the Japan Patent Office, the entire contents of both are hereby incorporated by reference.

BACKGROUND

Field

The present disclosure relates to a power transmitting device that contactlessly transmits alternating-current power to be transmitted, and a power receiving device that contactlessly receives the power transmitted from the power transmitting device.

Description of the Background Art

A contactless power transfer system is known that contactlessly transmits power from a power transmitting coil of a power transmitting device to a power receiving coil of a power receiving device. For example, Japanese Patent No. 5848359 discloses checking compatibility of a power transmitting device and a power receiving device by obtaining information of the size of a power transmitting coil or a power receiving coil through communication before starting contactless power transfer.

SUMMARY

In a contactless power transfer system, a relationship between a frequency of a power output and transmitted from a power transmitting unit of a power transmitting device (hereinafter also referred to as "power transmission frequency") and a resonance frequency of a power receiving unit of a power receiving device has a significant effect on power transfer efficiency.

In general, the power transmission frequency can be adjusted by controlling a switching frequency of an inverter of the power transmitting device. In contrast, the resonance frequency of the power receiving unit is determined by the power receiving unit's inductance, capacitance, etc., and when the power receiving unit is configured to be variable in inductance or capacitance, the power receiving unit's resonance frequency can also be adjusted by varying the power receiving unit's inductance or capacitance. When adjustment of a power transmission frequency and adjustment of a resonance frequency of the power receiving unit can both be performed, the two frequency adjustments may interfere with each other, and adjustment to an appropriate frequency may not be done or it may take a long time to adjust frequency, etc.

The present disclosure has been made to solve such a problem, and an object thereof is to suppress interference between a control applied to adjust a power transmission frequency and a control applied to adjust a resonance frequency of a power receiving unit, and thus allow appropriate frequency adjustment to be implemented.

(1) According to the present disclosure, a power transmitting device comprises: a power transmitting unit configured to contactlessly transmit alternating-current power to be transmitted to a power receiving unit of a power receiving device; and a controller configured to adjust a power transmission frequency representing a frequency of the power to be transmitted. The controller is configured to (i) use information received from the power receiving device to determine whether the power receiving device has a function of adjusting a resonance frequency of the power receiving unit, and (ii) use a result of the determination to determine whether to perform the control applied to adjust the power transmission frequency.

According to the above configuration, the controller uses information received from the power receiving device to determine whether the power receiving device has a function of adjusting a resonance frequency of the power receiving unit, and the controller uses a result thereof to determine whether to perform a control applied to adjust the power transmission frequency. This allows an approach to be taken in which for example when the power receiving device adjusts the resonance frequency, the power transmitting device does not adjust the power transmission frequency. This can suppress interference between a control applied to adjust the power transmission frequency and a control applied to control the resonance frequency of the power receiving unit, and thus implement appropriate frequency adjustment.

(2) In one embodiment, the controller is configured to: when the power receiving device does not have the function of adjusting the resonance frequency, adjust the frequency of the power to be transmitted; and when the power receiving device has the function of adjusting the resonance frequency, (i) compare a controllability of the resonance frequency with a controllability of the power transmission frequency, and (ii) if the controllability of the power transmission frequency is higher than the controllability of the resonance frequency, adjust the power transmission frequency.

(3) In one embodiment, the controller is configured to, if the power receiving device has the function of adjusting the resonance frequency and the controllability of the power transmission frequency is lower than the controllability of the resonance frequency, (i) fix the power transmission frequency to a predetermined value without adjusting the power transmission frequency, and (ii) transmit a signal to the power receiving device to request adjusting the resonance frequency.

According to the above configuration, when the power receiving device does not have the function of adjusting the resonance frequency a control is performed to adjust the power transmission frequency. In contrast, when the power receiving device has the function of adjusting the resonance frequency, one of power transmission frequency control and resonance frequency control that has higher controllability (such as a higher resolution, a larger adjustment range etc.) is performed. This can prevent interfere of control and also ensure controllability.

(4) In one embodiment, the controller is configured to, when the power receiving device specifies the power transmission frequency, (i) fix the power transmission frequency to a value specified by the power receiving device, without adjusting the power transmission frequency, and (ii) transmit a signal to the power receiving device to request adjusting the resonance frequency.

The above configuration can prevent interference of control and also prevent a power transmission frequency from being adjusted to a value other than that specified by the power receiving device.

(5) According to the present disclosure, a power receiving device comprises: a power receiving unit configured to contactlessly receive alternating-current power transmitted from a power transmitting device; and a controller configured to adjust a resonance frequency of the power receiving unit. The controller is configured to (i) use information received from the power transmitting device to determine whether the power transmitting device has a function of adjusting a power transmission frequency representing a frequency of the power transmitted, and (ii) use a result of the determination to determine whether to perform the control applied to adjust the resonance frequency.

According to the above configuration, the power receiving device uses information received from the power transmitting device to determine whether the power transmitting device has a function of adjusting the power transmission frequency, and the power receiving device uses a result thereof to determine whether to perform a control applied to adjust the resonance frequency of the power receiving unit. This allows an approach to be taken in which for example when the power transmitting device adjusts the power transmission frequency, the power receiving device does not adjust the power resonance frequency. This can suppress interference between a control applied to adjust the power transmission frequency and a control applied to control the resonance frequency of the power receiving unit, and thus implement appropriate frequency adjustment.

(6) In one embodiment, the controller is configured to: when the power transmitting device does not have the function of adjusting the power transmission frequency, adjust the resonance frequency; and when the power transmitting device has the function of adjusting the power transmission frequency, (i) compare a controllability of the resonance frequency with a controllability of the power transmission frequency, and (ii) if the controllability of the resonance frequency is higher than the controllability of the power transmission frequency, adjust the resonance frequency.

(7) In one embodiment, the controller is configured to, if the power transmitting device has the function of adjusting the power transmission frequency and the controllability of the resonance frequency is lower than the controllability of the power transmission frequency, (i) fix the resonance frequency to a predetermined value without adjusting the resonance frequency, and (ii) transmit a signal to the power transmitting device to request adjusting the power transmission frequency.

According to the above configuration, when the power transmitting device does not have the function of adjusting the power transmission frequency a control is performed to adjust the power receiving unit's resonance frequency. In contrast, when the power transmitting device has the function of adjusting the power transmission frequency, one of power transmission frequency control and resonance frequency control that has higher controllability (such as a higher resolution, a larger adjustment range etc.) is performed. This can prevent interfere of control and also ensure controllability.

(8) In one embodiment, the controller is configured to, when the power transmitting device specifies the resonance frequency, (i) fix the resonance frequency to a value specified by the power transmitting device, without adjusting the resonance frequency, and (ii) transmit a signal to the power transmitting device to request adjusting the power transmission frequency.

The above configuration can prevent interference of control and also prevent the power receiving unit's resonance frequency from being adjusted to a value other than that specified by the power transmitting device.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a flowchart (No. 3) showing an example of a procedure of a process performed by the power transmitting device and the power receiving device.

FIG. 9 is a flowchart (No. 4) showing an example of a procedure of a process performed by the power transmitting device and the power receiving device.

DESCRIPTION OF THE EMBODIMENTS

The present disclosure will now be described in embodiments hereinafter in detail with reference to the drawings. In the figures, identical or corresponding components are identically denoted and will not be described redundantly.

<Configuration of Power Transfer System>

Figure 1:
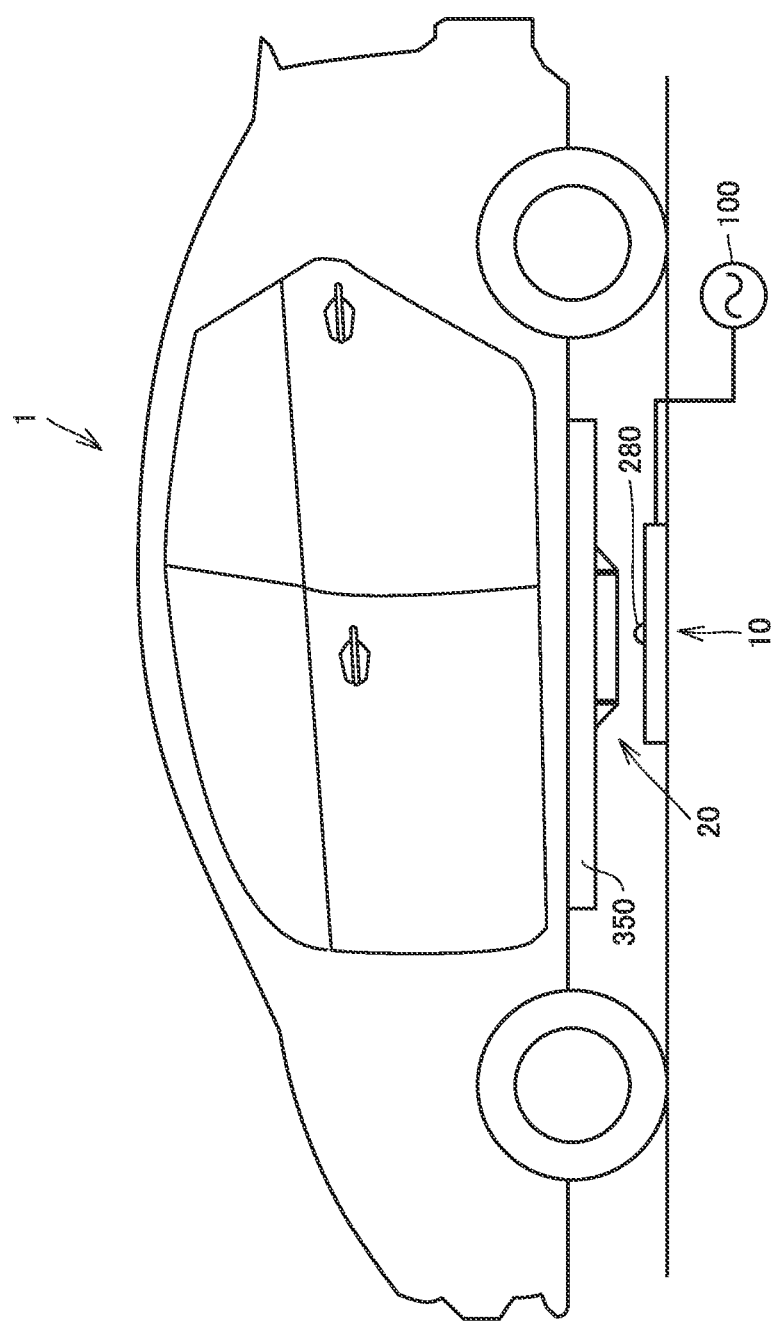
FIG. 1 generally shows a power transfer system.

FIG. 1 generally shows a power transfer system according to the present embodiment. The power transfer system comprises a vehicle 1 and a power transmitting device 10. Vehicle 1 includes a power receiving device 20. Power receiving device 20 is provided on a bottom surface of vehicle 1 and is provided, for example, on a lower surface (a road facing side) of a power storage device 350 installed on a bottom surface of vehicle 1.

Power transmitting device 10 receives power supplied from an alternate current (AC) power supply 100 (for example, a commercial grid power supply). Power transmitting device 10 is installed on the ground and configured to contactlessly transmit power to power receiving device 20 of vehicle 1 via a magnetic field in a state in which vehicle 1 is aligned such that power receiving device 20 faces power transmitting device 10.

Furthermore, power transmitting device 10 includes a camera 280. Camera 280 is equipped with a fisheye lens and is provided substantially at the center of the upper surface of power transmitting device 10. Camera 280 provided with the fisheye lens is configured to capture a large space including power receiving device 20 when vehicle 1 moves toward power transmitting device 10. An image captured by camera 280 can be used to detect a relative positional relationship of power receiving device 20 with respect to power transmitting device 10.

Figure 2:
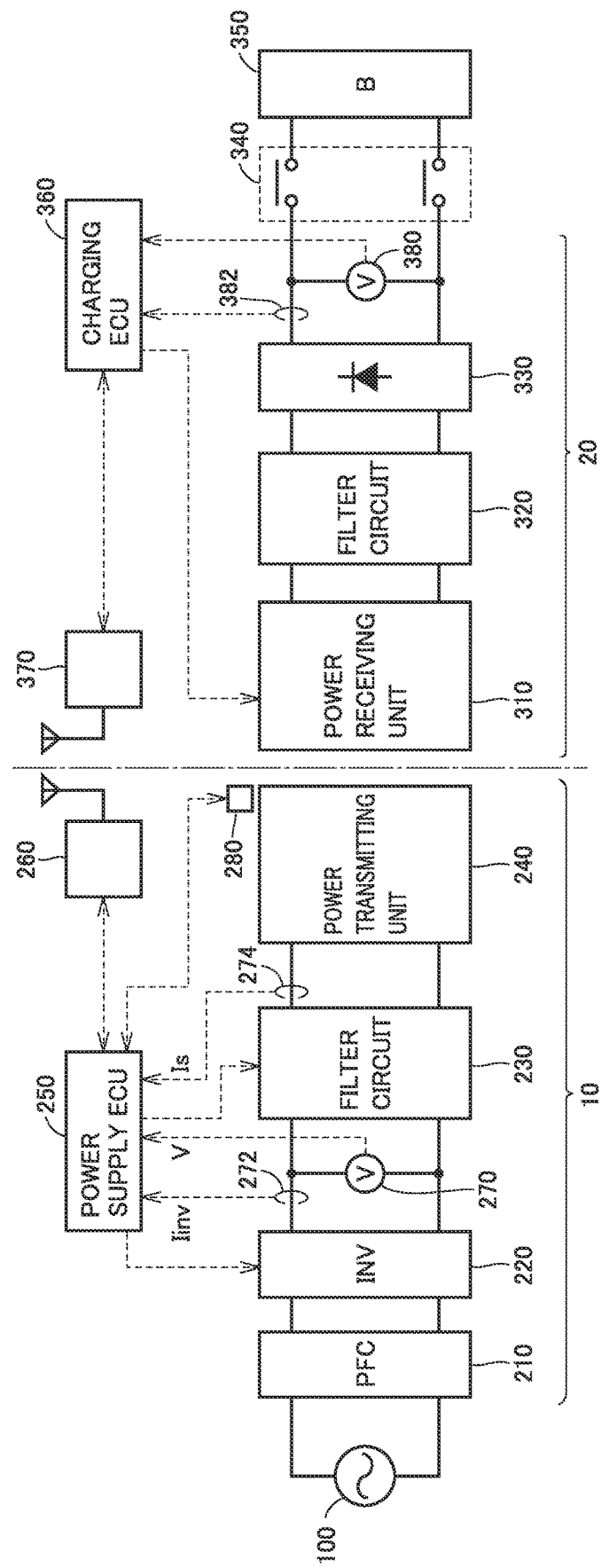
FIG. 2 shows the power transfer system in configuration.

FIG. 2 shows the FIG. 1 power transfer system in configuration. Power transmitting device 10 includes a power factor correction (PFC) circuit 210, an inverter 220, a filter circuit 230, and a power transmitting unit 240. Furthermore, power transmitting device 10 further includes a power supply ECU (Electronic Control Unit) 250, a communication unit 260, a voltage sensor 270, current sensors 272 and 274, and camera 280 (see FIG. 1).

PFC circuit 210 receives power from AC power supply 100, rectifies and increases the power in voltage, and supplies the power to inverter 220, and also brings an input current close to a sinusoidal wave to correct a power factor. PFC circuit 210 can be a variety of types of known PFC circuits. Note that in place of PFC circuit 210, a rectifier which does not have a power factor correcting function may be used.

Inverter 220 is controlled by power supply ECU 250, and receives a direct-current (DC) power from PFC circuit 210 and converts the received DC power to (AC) power having a prescribed frequency (for example of several tens of kHz) to be transmitted. Inverter 220 can change a switching frequency in response to a control signal received from power supply ECU 250 to adjust a frequency of a power to be transmitted (hereinafter also referred to as a "power transmission frequency") with a prescribed resolution. Inverter 220 is composed for example of a single-phase full bridge circuit.

Filter circuit 230 is provided between inverter 220 and power transmitting unit 240 and can suppress harmonic noise generated from inverter 220. Filter circuit 230 is composed of an LC filter including an inductor and a capacitor.

Power transmitting unit 240 receives from inverter 220 through filter circuit 230 AC power (or power to be transmitted) generated by inverter 220, and transmits the power to power receiving unit 310 of power receiving device 20 contactlessly through a magnetic field generated around power transmitting unit 240. Power transmitting unit 240 includes a resonance circuit for transmitting power to power receiving unit 310 contactlessly, as will be described hereinafter. While the resonance circuit can be composed of a coil and a capacitor, the resonance circuit may dispense with the capacitor if the coil can alone form a desired resonant state.

Voltage sensor 270 senses a voltage V output from inverter 220 and outputs the sensed value to power supply ECU 250. Current sensor 272 senses a current flowing through inverter 220, that is, a current Iinv output from inverter 220, and outputs the sensed value to power supply ECU 250. It should be noted that based on the sensed values of voltage sensor 270 and current sensor 272, the power supplied from inverter 220 to power transmitting unit 240 to be transmitted can be sensed. Current sensor 274 senses a current Is flowing to power transmitting unit 240 and outputs the sensed value to power supply ECU 250.

Communication unit 260 is configured to wirelessly communicate with communication unit 370 of power receiving device 20. When power transmitting device 10 transmits power to power receiving device 20, communication unit 260 receives control information of power receiving device 20 transmitted by power receiving device 20 (such as a resonance frequency of power receiving unit 310) and transmits control information of power transmitting device 10 (such as a power transmission frequency) to power receiving device 20. Further, when vehicle 1 (or power receiving device 20) is aligned with respect to power transmitting device 10, communication unit 260 transmits to power receiving device 20 data of an image captured by camera 280.

Power supply ECU 250 includes a CPU (Central Processing Unit), a ROM (Read Only Memory) for storing a processing program or the like, a RAM (Random Access Memory) for temporarily storing data, an input/output port for inputting/outputting various signals, etc., none of which is shown, and receives a signal from each above sensor, etc., and executes control of various devices in power transmitting device 10. Note that each type of control is not necessarily processed by software, and can also be processed by dedicated hardware (or electronic circuitry).

While power is transmitted to power receiving device 20, power supply ECU 250 executes control for setting the magnitude of the power to a target power. Specifically, power supply ECU 250 controls the magnitude of the power to the target power by adjusting a duty of a switching operation of inverter 220.

Furthermore, power supply ECU 250 can execute control to adjust a power transmission frequency to allow power transmitting device 10 to transmit power to power receiving device 20 more efficiently (hereinafter also referred to as "power transmission frequency adjustment control"). The power transmission frequency adjustment control is implemented by power supply ECU 250 controlling the switching frequency of inverter 220. In the present embodiment, the power transmission frequency control controls the power transmission frequency within an adjustment range (an adjustable range) as predetermined, and power supply ECU 250 can adjust the power transmission frequency within that adjustment range.

Power receiving device 20 includes a power receiving unit 310, a filter circuit 320, a rectifying unit 330, a relay circuit 340, and a power storage device 350. Furthermore, power receiving device 20 further includes a charging ECU 360, a communication unit 370, a voltage sensor 380, and a current sensor 382.

Power receiving unit 310 receives contactlessly through a magnetic field the (AC) power output and thus transmitted from power transmitting unit 240 of power transmitting device 10. Power receiving unit 310 for example includes a resonance circuit (not shown) for receiving power from power transmitting unit 240 contactlessly. The resonance circuit of power receiving unit 310 is composed of a coil and a capacitor.

Filter circuit 320 is provided between power receiving unit 310 and rectifying unit 330, and suppresses harmonic noise generated when power receiving unit 310 receives power. Filter circuit 320 is composed for example of an LC filter including an inductor and a capacitor. Rectifying unit 330 rectifies AC power received by power receiving unit 310 and outputs the rectified power to power storage device 350. Rectifying unit 330 includes a smoothing capacitor together with a rectifier.

Power storage device 350 is a rechargeable direct current (DC) power supply, and includes a lithium-ion or nickel metal hydride battery or a similar secondary battery. Power storage device 350 stores power output from rectifying unit 330. Then, power storage device 350 supplies the stored power to a vehicle driving device (an inverter and a driving motor, etc.) (not shown). Note that an electric double layer capacitor or the like can also be adopted as power storage device 350.

Relay circuit 340 is provided between rectifying unit 330 and power storage device 350. Relay circuit 340 is brought into conduction (or turned on) when power transmitting device 10 charges power storage device 350. Voltage sensor 380 senses voltage output from rectifying unit 330 (or received power's voltage) and outputs the sensed value to charging ECU 360. Current sensor 382 senses a current output from rectifying unit 330 (or received power's current) and outputs the sensed value to charging ECU 360. Based on the sensed values of voltage sensor 380 and current sensor 382, power received by power receiving unit 310, which corresponds to power charged to power storage device 350, can be sensed. Voltage sensor 380 and current sensor 382 may be provided between power receiving unit 310 and rectifying unit 330 (for example, between filter circuit 320 and rectifying unit 330).

Charging ECU 360 includes a CPU, a ROM, a RAM, an input/output port, and the like, none of which is shown, and receives a signal from each above sensor and the like and also controls various types of devices in power receiving device 20. Note that each type of control is not necessarily processed by software, and can also be processed by dedicated hardware (or electronic circuitry).

While power is received from power transmitting device 10, charging ECU 360 generates a target of power in power transmitting device 10 to be transmitted (a target power) so that power receiving device 20 receives power of a desired target. Then, charging ECU 360 transmits the generated target of power to be transmitted (or the target power) to power transmitting device 10 by communication unit 370.

Figure 4:
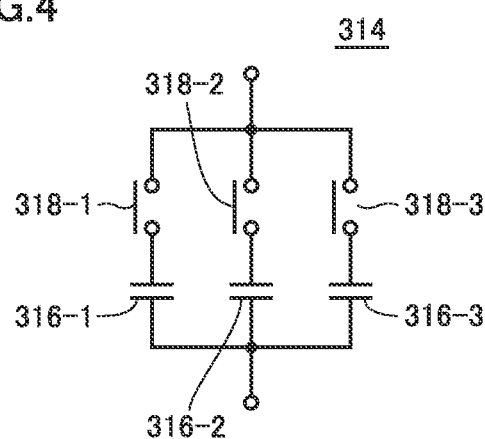
FIG. 4 is a diagram showing an example in configuration of a capacitor of the power receiving unit.
Figure 5:
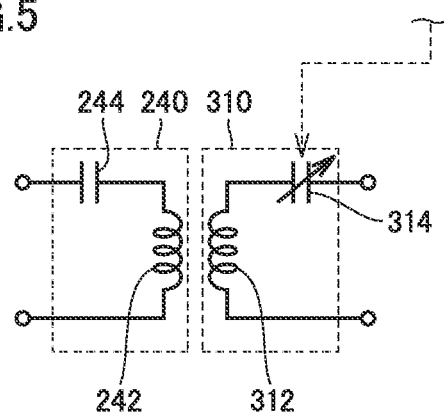
FIG. 5 is a diagram showing another example in configuration of the capacitor of the power receiving unit.

Furthermore, charging ECU 360 can execute control to adjust a resonance frequency of power receiving unit 310 to allow power transmitting unit 240 to transmit power to power receiving unit 310 more efficiently (hereinafter also referred to as "resonance frequency adjustment control"). The present embodiment is configured such that a capacitance from power receiving unit 310 is adjustable (see FIGS. 4, 5 shown hereinafter), and the resonance frequency adjustment control is implemented by charging ECU 360 changing the capacitance of power receiving unit 310. Furthermore, in the present embodiment, the resonance frequency adjustment control controls the resonance frequency within an adjustment range (an adjustable range) as predetermined, and charging ECU 360 can adjust the resonance frequency within that adjustment range.

Communication unit 370 is configured to wirelessly communicate with communication unit 260 of power transmitting device 10. When power transmitting device 10 transmits power to power receiving device 20, communication unit 370 receives control information transmitted from power transmitting device 10 (such as a power transmission frequency) and transmits control information of power receiving device 20 to power transmitting device 10 (such as a resonance frequency of power receiving unit 310). Furthermore, as described above, communication unit 370 receives data (a position detection result) indicative of a relative positional relationship between power transmitting device 10 and power receiving device 20 from charging ECU 360 and transmits the data to power transmitting device 10.

In this power transfer system, in power transmitting device 10, AC power to be transmitted is supplied from inverter 220 through filter circuit 230 to power transmitting unit 240. When the AC power to be transmitted is supplied to power transmitting unit 240, energy (or power) moves from power transmitting unit 240 to power receiving unit 310 through a magnetic field formed between a power transmitting coil 242 of power transmitting unit 240 and a power receiving coil 312 of power receiving unit 310. The energy (or power) moved to power receiving unit 310 is supplied to power storage device 350 through filter circuit 320 and rectifying unit 330.

Figure 3:
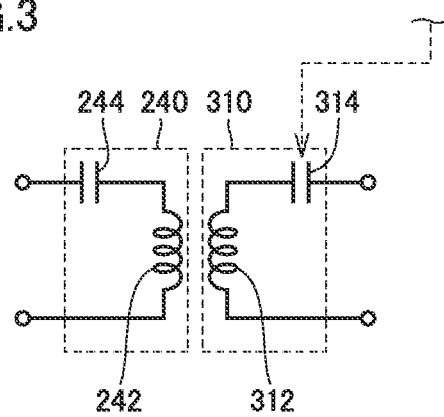
FIG. 3 is a diagram showing an example of a circuit configuration of a power transmitting unit and a power receiving unit.

FIG. 3 shows an example of a circuit configuration of power transmitting unit 240 and power receiving unit 310 shown in FIG. 2. Power transmitting unit 240 includes power transmitting coil 242 and a capacitor 244. Capacitor 244 is connected to power transmitting coil 242 in series to cooperate therewith to form a resonance circuit. The resonance circuit composed of power transmitting coil 242 and capacitor 244 has a resonance strength, which in some embodiments is indicated by a Q value of 100 or more.

Power receiving unit 310 includes power receiving coil 312 and a capacitor 314. Capacitor 314 is connected to power receiving coil 312 in series to cooperate therewith to form a resonance circuit. The resonance circuit composed of power receiving coil 312 and capacitor 314 and in some embodiments has a Q value of 100 or more. Power transmitting unit 240 and power receiving unit 310 may each have the capacitor connected to the coil in parallel.

In the present embodiment, capacitor 314 is configured to be variable in capacitance in response to a control signal received from charging ECU 360 (see FIG. 2). When charging ECU 360 changes capacitor 314 in capacitance, power receiving unit 310 is adjusted in resonance frequency.

FIG. 4 shows an example in configuration of capacitor 314 of power receiving unit 310. Capacitor 314 includes, for example, capacitance units 316-1 to 316-3 connected in parallel and relays 318-1 to 318-3 connected to capacitance units 316-1 to 316-3, respectively, in series. Capacitance units 316-1 to 316-3 are each configured including a ceramic capacitor, for example. Relays 318-1 to 318-3 are switched on/off in response to a control signal received from charging ECU 360. By charging ECU 360 appropriately controlling relays 318-1 to 318-3, capacitor 314 can be adjusted in capacitance discretely, and accordingly, the resonance frequency can also be discretely adjusted.

Note that the configuration of capacitor 314 is not limited to the configuration shown in FIG. 4.

FIG. 5 shows another example in configuration of capacitor 314. As shown in FIG. 5, capacitor 314 may be a variable capacitor configured to continuously variable in capacitance in response to a control signal received from charging ECU 360. In this case, charging ECU 360 can adjust capacitor 314 in capacitance with a prescribed resolution, and hence the resonance frequency with a predetermined resolution.

<Relationship Between Power Transmission Frequency Adjustment Control and Resonance Frequency Adjustment Control>

As has been described above, when power transmitting device 10 transmits power to power receiving device 20, power transmitting device 10 (more specifically, power supply ECU 250) can adjust a power transmission frequency to provide higher power transfer efficiency, i.e., can perform power transmission frequency adjustment control. Furthermore, power receiving device 20 (more specifically, charging ECU 360) can adjust a resonance frequency of power receiving unit 310 to provide higher power transfer efficiency, i.e., can perform resonance frequency adjustment control.

The power transmission frequency adjustment control and the resonance frequency adjustment control are both control applied to adjust frequency. When these controls interfere with each other, there is a possibility that a frequency cannot be adjusted to be an appropriate frequency or that it takes time to adjust the frequency.

In view of the above, power transmitting device 10 according to the present embodiment receives control information of power receiving device 20 from power receiving device 20. The control information received from power receiving device 20 includes function information indicating whether power receiving device 20 has a function of performing the resonance frequency adjustment control, information indicating controllability of the resonance frequency adjustment control (such as a resolution, an adjustment range, etc.), and the like.

Power transmitting device 10 uses the control information received from power receiving device 20 to determine whether power receiving device 20 has the function of performing the resonance frequency adjustment control. When power receiving device 20 has the function of performing the resonance frequency adjustment control, power transmitting device 10 compares in controllability the power transmission frequency adjustment control performed by itself with the resonance frequency adjustment control performed by power receiving device 20, and, depending on a result of the comparison, selects one of the controls to prevent the controls from interfering with each other.

Hereinafter, in the present embodiment, an example of using resolution as information indicating controllability will be described.

Figure 6:
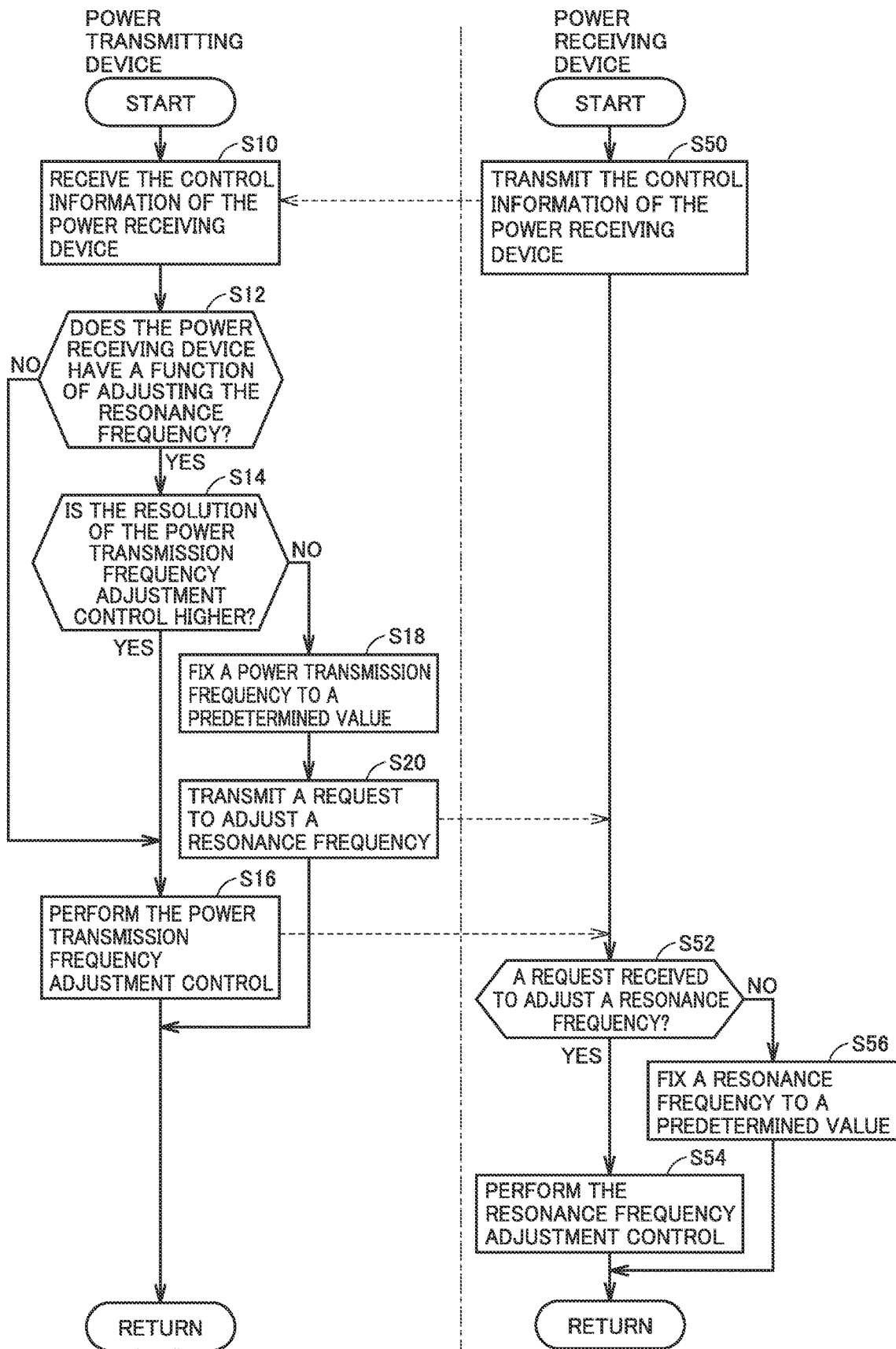
FIG. 6 is a flowchart (No. 1) showing an example of a procedure of a process performed by the power transmitting device and the power receiving device.

FIG. 6 is a flowchart showing an example of a procedure of a process performed by power transmitting device 10 (power supply ECU 250) and power receiving device 20 (charging ECU 360). In FIG. 6, a procedure of a process performed by power transmitting device 10 is shown on the left side and a procedure of a process performed by power receiving device 20 is shown on the right side.

Initially, an example of the procedure of the process performed by power transmitting device 10 will be described. Power transmitting device 10 receives the control information of power receiving device 20 from power receiving device 20 (step S10). As has been described above, the control information of power receiving device 20 includes function information indicating whether power receiving device 20 has a function of performing the resonance frequency adjustment control, information indicating controllability of the resonance frequency adjustment control (such as a resolution, an adjustment range, etc.).

Using the control information (or function information) received from power receiving device 20 in step S10, power transmitting device 10 determines whether power receiving device 20 has a function of adjusting the resonance frequency of power receiving unit 310 (step S12).

When power receiving device 20 has the function of adjusting the resonance frequency (YES in step S12), there is a possibility that the resonance frequency adjustment control on the power receiving device 20 side and the power transmission frequency adjustment control on the power transmitting device 10 side may interfere with each other, and accordingly, power transmitting device 10 selects one of the controls through the following procedure:

Initially, power transmitting device 10 determines whether a resolution of the power transmission frequency adjustment control by power transmitting device 10 is higher than a resolution (a resolution of the resonance frequency adjustment control) received from power receiving device 20 in step S10 (that is, the former allows a frequency to be adjusted more precisely than the latter) (step S14). Note that the power transmission frequency adjustment control's resolution is previously stored in the ROM of power supply ECU 250.

When it is determined that the resolution of the power transmission frequency adjustment control is higher (YES in step S14), power transmitting device 10 performs the power transmission frequency adjustment control having higher controllability (step S16). In doing so, power transmitting device 10 notifies power receiving device 20 that the power transmission frequency adjustment control is to be performed.

In contrast, when it is determined that the resolution of the resonance frequency adjustment control is higher (NO in step S14), power transmitting device 10 selects the resonance frequency adjustment control having higher controllability. Specifically, power transmitting device 10 does not perform the power transmission frequency adjustment control and instead fixes a power transmission frequency to a predetermined value (step S18), and transmits information indicating the fixed power transmission frequency's value to power receiving device 20 together with a request to adjust a resonance frequency (step S20).

An example of the procedure of the process performed by power receiving device 20 will be described. Power receiving device 20 transmits the above-described control information (the above-described function information, information indicating controllability, etc.) of power receiving device 20 to power transmitting device 10 (step S50).

Subsequently, power receiving device 20 determines whether a request has been received from power transmitting device 10 to adjust a resonance frequency (step S52).

When the request has been received from power transmitting device 10 to adjust a resonance frequency (YES in step S52), power receiving device 20 determines that the power transmission frequency adjustment control is not performed on the power transmitting device 10 side, and power receiving device 20 performs the resonance frequency adjustment control (Step S54).

In contrast, when the request has not been received from power transmitting device 10 to adjust a resonance frequency (NO in step S52), power receiving device 20 will receive notification from power transmitting device 10 indicating that power transmitting device 10 performs the power transmission frequency adjustment control, and accordingly, power receiving device 20 does not perform the resonance frequency adjustment control and instead fixes a resonance frequency to a predetermined value (step S56).

Thus, according to the present embodiment, power transmitting device 10 uses the control information received from power receiving device 20 to determine whether power receiving device 20 has a function of performing resonance frequency adjustment control to adjust power receiving unit 310 in resonance frequency. When power receiving device 20 has the function of performing the resonance frequency adjustment control, power transmitting device 10 selects one of the power transmission frequency adjustment control and the resonance frequency adjustment control that has a higher resolution. This can prevent interference of frequency adjustment control and also ensures controllability thereof (i.e., a frequency allowing higher power transfer efficiency can more precisely be searched for).

First Exemplary Variation

While in the above embodiment an example of using resolution as information indicating controllability has been described, the information indicating controllability is not limited thereto. For example, a frequency adjustment range (a frequency adjustable range) may be used as the information indicating controllability.

Figure 7:
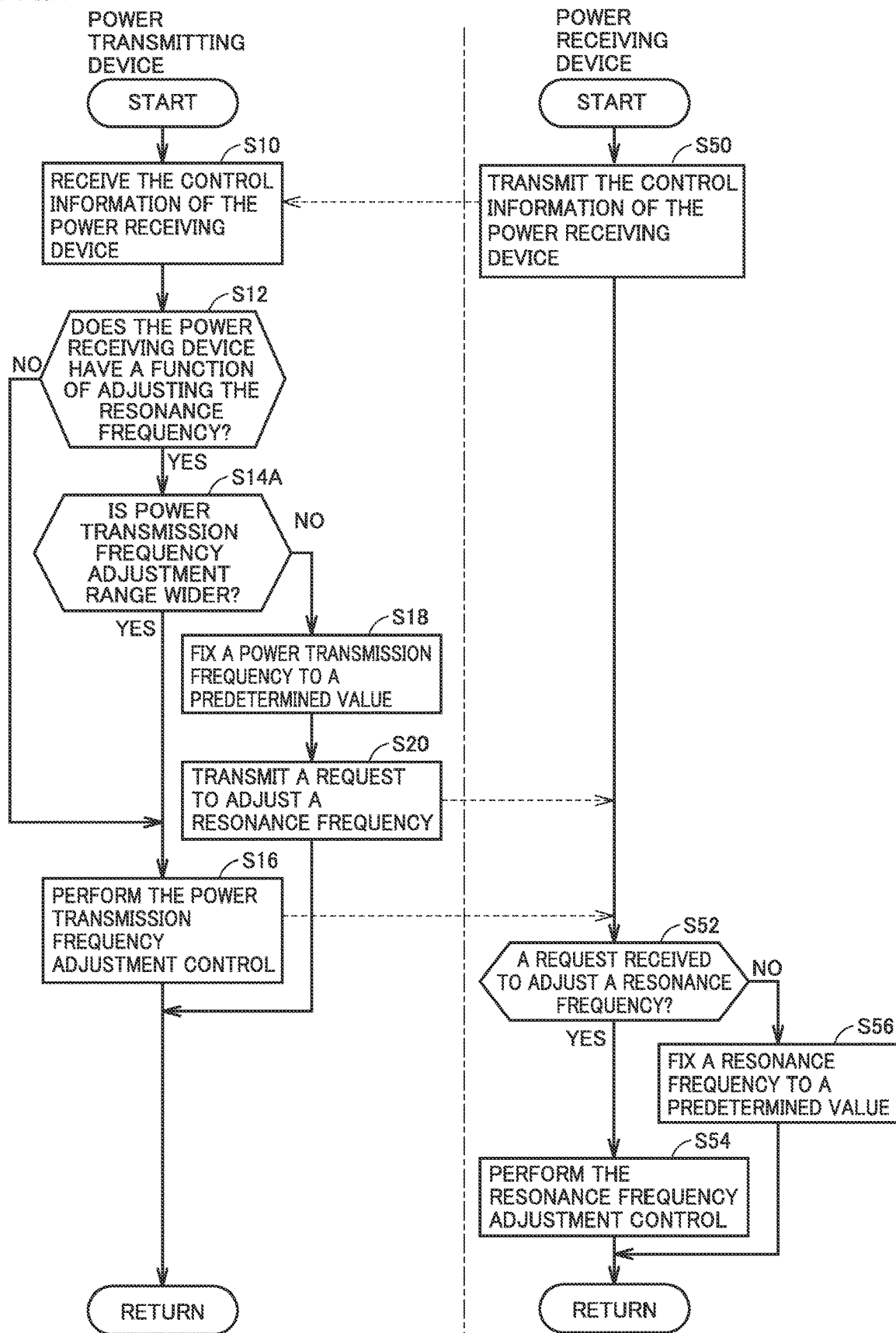
FIG. 7 is a flowchart (No. 2) showing an example of a procedure of a process performed by the power transmitting device and the power receiving device.

FIG. 7 is a flowchart showing an example of a procedure of a process performed by power transmitting device 10 and power receiving device 20 in the first exemplary variation. The flowchart shown in FIG. 7 corresponds to that shown in FIG. 6 with step S14 replaced with step S14A. The other steps (the steps having numbers identical to those shown in FIG. 6) have already been described, and accordingly, will not be described redundantly.

When power receiving device 20 has a resonance frequency adjustment function (YES in step S12), power transmitting device 10 determines whether a power transmission frequency adjustment range by power transmitting device 10 is wider than a frequency adjustment range (a resonance frequency adjustment range) received from power receiving device 20 in step S10 (that is, the former allows a frequency to be adjusted over a wider range than the latter and is thus larger in robustness than the latter) (step S14A). Note that the power transmission frequency adjustment range is previously stored in the ROM of power supply ECU 250.

When it is determined that the power transmission frequency adjustment range is wider (YES in step S14A), power transmitting device 10 performs the power transmission frequency adjustment control having higher controllability (step S16).

In contrast, when it is not determined that the power transmission frequency adjustment range is wider (NO in step S14A), power transmitting device 10 selects the resonance frequency adjustment control having higher controllability.

Using a frequency adjustment range as information indicating controllability can prevent interference of frequency adjustment control and also ensures controllability (i.e., can enhance robustness against disturbance such as variation between components and positional displacement, and the like).

<Second Exemplary Variation>

In the above embodiment, an example has been described in which when the power transmission frequency adjustment control and the resonance frequency adjustment control can be performed, the control having higher controllability is selected.

However, when power receiving device 20 indicates a power transmission frequency to power transmitting device 10, then, regardless of a result of comparison of controllability, the power transmission frequency may be fixed to the value specified by power receiving device 20.

FIG. 8 is a flowchart showing an example of a procedure of a process performed by power transmitting device 10 and power receiving device 20 according to the second exemplary variation. The flowchart shown in FIG. 8 corresponds to that shown in FIG. 6 with steps S10 and S50 replaced with steps S10A and S50A, respectively, plus steps S30 and S32 performed by power transmitting device 10. The other steps (the steps having numbers identical to those shown in FIG. 6) have already been described, and accordingly, will not be described redundantly.

Power receiving device 20 transmits control information of power receiving device 20 to power transmitting device 10 (step S50A). The control information transmitted by power receiving device 20 to power transmitting device 10 in step S50A includes, in addition to the above-described function information and information indicating controllability (i.e., a resolution, an adjustment range, etc.), specifying information indicating whether to specify a power transmission frequency, and information indicating a specified value of the power transmission frequency.

Power transmitting device 10 receives the control information transmitted by power receiving device 20 in step S50A (step S10A).

Using the control information (or specifying information) received in step S10A, power transmitting device 10 determines whether power receiving device 20 specifies a power transmission frequency (step S30).

If power receiving device 20 does not specify a power transmission frequency (NO in step S30), power transmitting device 10 shifts the process to step S12.

If power receiving device 20 specifies a power transmission frequency (YES in step S30), power transmitting device 10 does not perform the power transmission frequency adjustment control and instead fixes the power transmission frequency to the value specified by power receiving device 20 (step S32), and transmits to power receiving device 20 information indicating the fixed power transmission frequency's value, and together therewith, a request to adjust a resonance frequency (step S20).

This can prevent interference of frequency adjustment control and also prevent a power transmission frequency from being adjusted to a value other than that specified by power receiving device 20.

<Third Exemplary Variation>

In the above embodiment, an example has been described in which when the power transmission frequency adjustment control and the resonance frequency adjustment control can be performed, power transmitting device 10 subjectively determines which control should be performed. Alternatively, power receiving device 20 may subjectively determine which control should be performed.

FIG. 9 is a flowchart showing an example of a procedure of a process performed by power transmitting device 10 and power receiving device 20 according to a third exemplary variation. In FIG. 9, a procedure of a process performed by power receiving device 20 is shown on the left side and a procedure of a process performed by power transmitting device 10 is shown on the right side.

Steps S10B to S20B performed by power receiving device 20 in FIG. 9 correspond to steps S10 to S20 performed by power transmitting device 10 in the flowchart of FIG. 6, respectively. Steps S 50B to S 54B performed by power transmitting device 10 in FIG. 9 correspond to steps S50 to S54 performed by power receiving device 20 in the flowchart of FIG. 6, respectively.

Initially, an example of the procedure of the process performed by power receiving device 20 in the third exemplary variation will be described. Power receiving device 20 receives the control information of power transmitting device 10 from power transmitting device 10 (step S10B). The control information received from power transmitting device 10 includes function information indicating whether power transmitting device 10 has a function of performing the power transmission frequency adjustment control, information indicating controllability of the power transmission frequency adjustment control (such as a resolution, an adjustment range, etc.), and the like.

Using the control information received from power transmitting device 10 in step S10B, power receiving device 20 determines whether power transmitting device 10 has a power transmission frequency adjustment function (step S12B).

If power transmitting device 10 does not have the power transmission frequency adjustment function (NO in step S12B), power receiving device 20 performs the resonance frequency adjustment control (step S16B).

If power transmitting device 10 has the power transmission frequency adjustment function (YES in step S12B), power receiving device 20 determines whether the resonance frequency adjustment control has a resolution higher than a resolution (a resolution of the power transmission frequency adjustment control) received in step S10B (step S14B).

If the resonance frequency adjustment control has a higher resolution (YES in step S14B), power receiving device 20 performs the resonance frequency adjustment control (step S16B).

If the power transmission frequency adjustment control has a higher resolution (NO in step S14B), power receiving device 20 fixes the resonance frequency to a predetermined value (step S18B), and transmits to power transmitting device 10 information indicating the fixed resonance frequency's value, and together therewith, a request to adjust a power transmission frequency (step S20B).

Hereinafter, an example of the procedure of the process performed by power transmitting device 10 in the third exemplary variation will be described. Power transmitting device 10 transmits control information of power transmitting device 10 to power receiving device 20 (step S50B). Subsequently, power transmitting device 10 determines whether a request has been received from power receiving device 20 to adjust a power transmission frequency (step S52B).

If a request has been received from power receiving device 20 to adjust a power transmission frequency (YES in step S52B), power transmitting device 10 determines that the resonance frequency adjustment control is not performed on the power receiving device 20 side, and power transmitting device 10 performs the power transmission frequency adjustment control (Step S54B).

If a request has not been received from power receiving device 20 to adjust a power transmission frequency (NO in step S52B), power transmitting device 10 does not perform the power transmission frequency adjustment control and instead fixes the power transmission frequency to a predetermined value (step S56B).

Thus, power receiving device 20 may subjectively determine which one of the power transmission frequency adjustment control and the resonance frequency adjustment control should be performed.

Fourth Exemplary Variation

In the above embodiment, an example has been indicated in which power receiving unit 310 has capacitor 314 configured variably in capacitance and the power receiving unit 310 capacitor 314 is varied in capacitance to adjust a resonance frequency of power receiving unit 310.

However, the method of adjusting the resonance frequency of power receiving unit 310 is not limited thereto. For example, power receiving unit 310 may have power receiving coil 312 with an inductor configured variably and the inductor of power receiving coil 312 may be varied to adjust a resonance frequency of power receiving unit 310.

The above described embodiments and the first to fourth exemplary variations can also be combined as appropriate within a range in which no technological contradiction arises.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power receiving device comprising:
a power receiving unit configured to contactlessly receive alternating-current power transmitted from a power transmitting device; and
a controller configured to adjust a resonance frequency of the power receiving unit,
the controller being configured to use information received from the power transmitting device to determine whether the power transmitting device has a function of adjusting a power transmission frequency representing a frequency of the power transmitted, and use a result of the determination to determine whether to perform the control applied to adjust the resonance frequency;
when the power transmitting device does not have the function of adjusting the power transmission frequency, adjust the resonance frequency; and
when the power transmitting device has the function of adjusting the power transmission frequency, compare a controllability of the resonance frequency with a controllability of the power transmission frequency, and when the controllability of the resonance frequency is higher than the controllability of the power transmission frequency, adjust the resonance frequency.

2. The power receiving device according to claim 1, wherein the controller is configured to, when the power transmitting device has the function of adjusting the power transmission frequency and the controllability of the resonance frequency is lower than the controllability of the power transmission frequency, fix the resonance frequency to a predetermined value without adjusting the resonance frequency, and transmit a signal to the power transmitting device to request adjusting the power transmission frequency.

3. The power receiving device according to claim 1, wherein the controller is configured to, when the power transmitting device specifies the resonance frequency, fix the resonance frequency to a value specified by the power transmitting device, without adjusting the resonance frequency, and transmit a signal to the power transmitting device to request adjusting the power transmission frequency.

* * * * *